United States Patent
Jung et al.

(10) Patent No.: US 7,526,280 B2
(45) Date of Patent: Apr. 28, 2009

(54) SERVICE IMPLEMENTING METHOD AND APPARATUS BASED ON AN ULTRAVIOLET INDEX IN A MOBILE TERMINAL

(75) Inventors: Jee-Young Jung, Busan (KR); Jae-Ik Jung, Daegu (KR); Young-Woo Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 992 days.

(21) Appl. No.: 10/849,207

(22) Filed: May 20, 2004

(65) Prior Publication Data
US 2004/0235431 A1 Nov. 25, 2004

(30) Foreign Application Priority Data
May 23, 2003 (KR) .................. 10-2003-0032770

(51) Int. Cl.
*H04M 3/42* (2006.01)

(52) U.S. Cl. .............. 455/414.2; 455/414.1; 455/404.1; 455/556.1; 455/556.2; 455/3.05; 455/3.06; 340/539.1; 340/539.11; 340/539.26

(58) Field of Classification Search ................ 455/41.1, 455/41.2, 401.1, 401.2, 414.1, 414.2, 456.1, 455/456.2, 456.3, 556.1, 556.2, 401.3, 401.4, 455/3.01–3.06, 566, 404.1; 340/539.1, 539.11, 340/539.12, 539.13, 539.26, 539.27, 539.28, 340/539.29, 572.1, 573.1
See application file for complete search history.

(56) References Cited

U.S. PATENT DOCUMENTS

| | | | | |
|---|---|---|---|---|
| 6,541,775 | B2 | 4/2003 | Yagi | 250/372 |
| 6,992,580 | B2* | 1/2006 | Kotzin et al. | 340/539.11 |
| 7,155,507 | B2* | 12/2006 | Hirano et al. | 709/224 |
| 7,221,928 | B2* | 5/2007 | Laird et al. | 455/404.1 |

* cited by examiner

*Primary Examiner*—Tuan A Tran
(74) *Attorney, Agent, or Firm*—Roylance, Abrams, Berdo & Goodman, L.L.P.

(57) ABSTRACT

A service implementing method and apparatus according to an ultraviolet (UV) index in a mobile terminal provides diverse information and services according to the UV index detected by the mobile terminal having a UV sensor mounted thereon. The service implementing method and apparatus includes switching over to a UV alarm function mode when an alarm function is selected in a UV management mode, setting a predetermined time interval for informing a user of the UV index when an alarm interval is selected in the UV alarm function mode. The service implementing method and apparatus further includes setting a specified time for informing the user of the UV index when an alarm time is selected in the UV alarm function mode, and setting avatars or alarm sounds for informing the user of the UV index according to the set time when an alarm method is selected in the UV alarm function mode.

25 Claims, 9 Drawing Sheets

SERVICE IMPLEMENTING METHOD AND APPARATUS BASED ON AN ULTRAVIOLET INDEX IN A MOBILE TERMINAL

PRIORITY

This application claims the benefit under 35 U.S.C. § 119 (a) of an application entitled "Service implementing method according to the ultraviolet index in a mobile terminal" filed in the Korean Industrial Property Office on May 23, 2003 and assigned Serial No. 2003-32770, the entire contents of which are incorporated herein by reference.

BACKGROUND OF THE INVENTION

1. Field of the Invention

The present invention relates generally to a mobile terminal. More particularly, the present invention relates to a method and apparatus for providing diverse information and services based on an ultraviolet index detected by a mobile terminal having an ultraviolet sensor mounted thereon.

2. Description of the Related Art

Ultraviolet rays are included in rays from diverse light sources including sunlight. Ultraviolet (UV) radiation, which has a shorter wavelength than blue or violet rays among visible rays, is divided into three types of rays: ultraviolet-A (UVA), ultraviolet-B (UVB) and ultraviolet-C (UVC). UVA, having a wavelength of about 320-400 nm is not absorbed in the ozone layer. A majority of UVB, having a wavelength of about 280-320 nm is absorbed into the ozone layer, but a portion thereof reaches the earth's surface. UVC, having a wavelength of about 100-280 nm is completely absorbed into the ozone layer.

Ultraviolet rays have the ability to sterilize, and if it is irradiated onto the human body, it causes production of vitamin-D in the human body. However, UVA and especially UVB penetrate into the skin resulting in sunburn, and may exert a bad effect on health, such as skin cancer and cataracts. Due to the thinning of the ozone layer and the resulting increase of the sun's ultraviolet rays that reach the earth's surface, associated risks to the human body are related to individuals' habits and the resulting level of exposure to the sun's rays.

It is recommended that a simple ultraviolet (UV) index that has been generally adopted throughout the world is used. The UV index refers to the amount of UVB radiation that reaches the earth's surface when the altitude of the sun is at a maximum, and incorporates 10 UV intensity levels on a scale of 0 to 9, where 0 indicates a minimal risk of overexposure and 9 or above indicates a very high risk. The UV index provides information on damage to the skin which may be caused by overexposure to the sun's rays, and it provides information to help a person plan their outdoor activities.

The UV index is classified into indexes of very low (0 to 2.9), low (3 to 4.9), moderate (5 to 6.9), high (7 to 8.9), and very high (over 9). When the UV index is very low, exposure to the sun's rays for about one hour and 50 minutes or more may cause the reddening of the skin (i.e., erythema), and when the UV index is low, exposure for about one hour and 40 minutes or more may cause the reddening of the skin. When the UV index is moderate, exposure for about one hour or more may cause the reddening of the skin, and when the UV index is high, exposure for about forty minutes or more may cause the reddening of the skin. When the UV index is very high, exposure for about 30 minutes or more may cause the reddening of the skin. As shown in FIG. 1, the degree of reddening of the skin according to the time of exposure may also differ based on skin type.

Since the amount of ozone in the stratosphere and clouds greatly affect the intensity of the UV rays that reach the earth's surface, the Korean Meteorological Administration provides UV index forecasts in view of the amount of ozone in the stratosphere and weather change. The Korean Meteorological Administration reports the UV index forecasts twice a day. The UV index for each day is reported at 6:00 Korean Standard Time (KST), and the UV index of the next day is reported at 18:00 KST.

However, although the report as described provides a UV index forecast, it does not provide the UV-related information that changes with the lapse of time, and thus it cannot properly anticipate the change of the UV rays. Also, since the report provides only brief information for a wide region, for example, Gangwondo, Seoul, and so on, the accuracy of the report is degraded when it is adopted in practical life.

SUMMARY OF THE INVENTION

Accordingly, the present invention has been made to solve the above-mentioned problems occurring in the prior art, and an object of the present invention is to provide a method and apparatus for providing diverse information and services according to an ultraviolet index detected by a mobile terminal having an ultraviolet sensor mounted thereon.

In order to accomplish this object, a service implementing method and apparatus according to an ultraviolet (UV) index in a mobile terminal is provided. The method and apparatus comprises switching over to a UV alarm function mode when an alarm function is selected in a UV management mode, setting a predetermined time interval for informing a user of the UV index when an alarm interval is selected in the UV alarm function mode, setting a specified time for informing a user of the UV index when an alarm time is selected in the UV alarm function mode, and setting avatars or alarm sounds for informing a user of the UV index according to the preset time when an alarm method is selected in the UV alarm function mode.

In another aspect of the present invention, there is provided a service implementing method and apparatus according to an ultraviolet (UV) index in a mobile terminal. The method and apparatus comprises displaying an accumulated UV index according to a corresponding time when a function of searching for the UV index is selected in a UV index management mode, and providing information according to the UV index when the mobile terminal connects to a mobile network in a state in which the UV index is displayed.

In still another aspect of the present invention, a service implementing method and apparatus according to an ultraviolet (UV) index in a mobile terminal is provided. The method and apparatus comprises informing a user of the UV index by an avatar or an alarm sound according to a set alarm method when a preset time elapses, and providing information according to the UV index when the mobile terminal connects to a mobile network in a state in which the UV index is displayed.

In still another aspect of the present invention, a service implementing method and apparatus according to an ultraviolet (UV) index in a mobile terminal is provided. The method and apparatus comprises giving a risk warning through an avatar, a warning sound, or a warning message, according to a set warning method when a high-risk UV index is found, and providing information according to the UV index when the mobile terminal is connected to a mobile network in a state in which the UV index is displayed.

BRIEF DESCRIPTION OF THE DRAWINGS

The above and other objects, features and advantages of the present invention will be more apparent from the following detailed description taken in conjunction with the accompanying drawings, in which.

It should be understood that in the drawings, like reference numbers refer to like features and structures.

DETAILED DESCRIPTION OF THE PREFERRED EMBODIMENTS

Hereinafter, a service implementing method and apparatus providing diverse information and services based on a ultraviolet (UV) index determined by a mobile terminal according to embodiments of the present invention will be described with reference to the accompanying drawings. In the following description of the present invention, a detailed description of known functions and configurations incorporated herein will be omitted for conciseness.

Although a number of specific exemplary features, such as a UV alarm method, a UV warning method, a kind of UV index search, information according to a UV index, and so on, are given, they are presented to provide a better understanding of the present invention. Also, it should be clear to those skilled in the art that the present invention can be practiced without such specific features or through their modifications.

In the embodiments of the present invention, avatars indicate animation characters that take the place of a user in cyber space.

Figure 1:
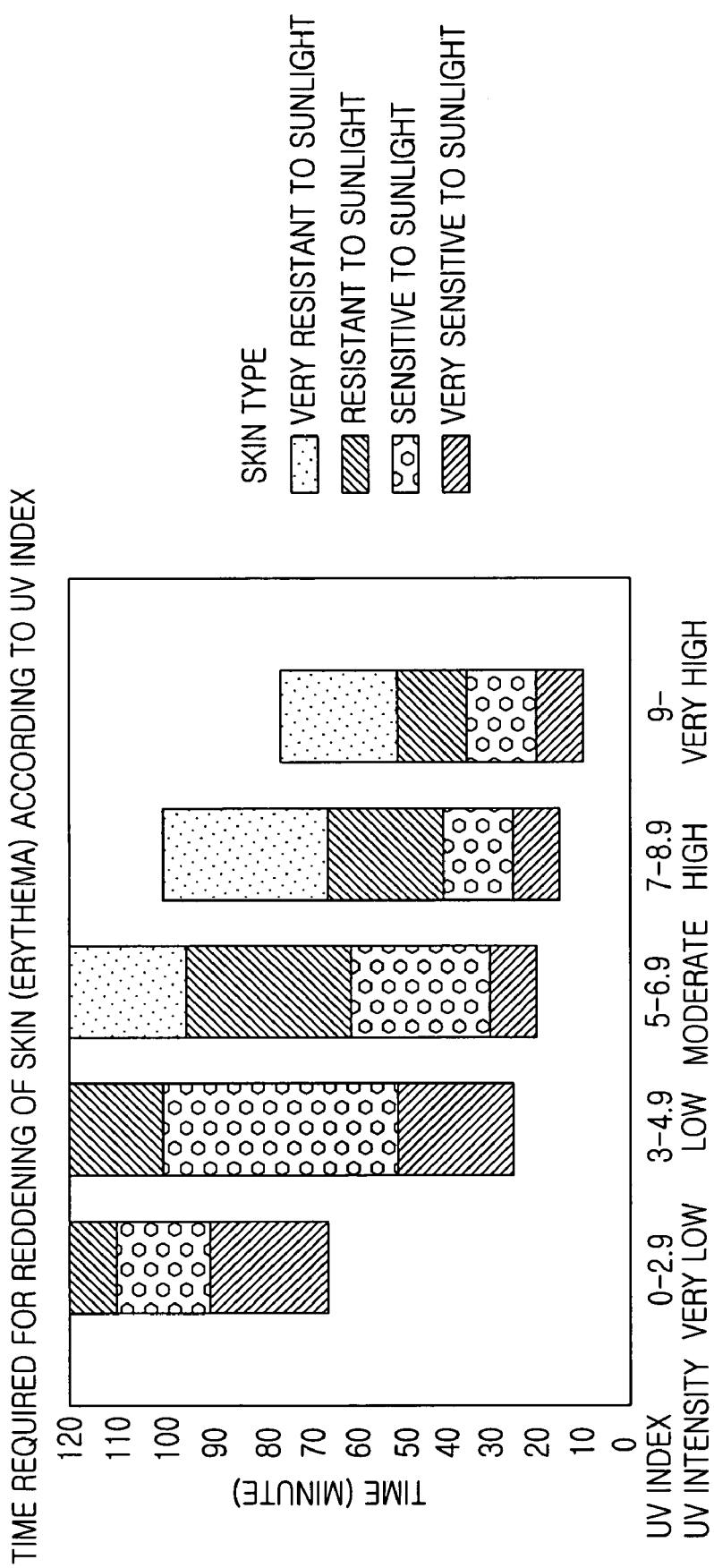
FIG. 1 is a bar graph illustrating sunburn times of occurrence when reddening of the skin is effected according to a UV index and a skin sensitivity index.
Figure 2:
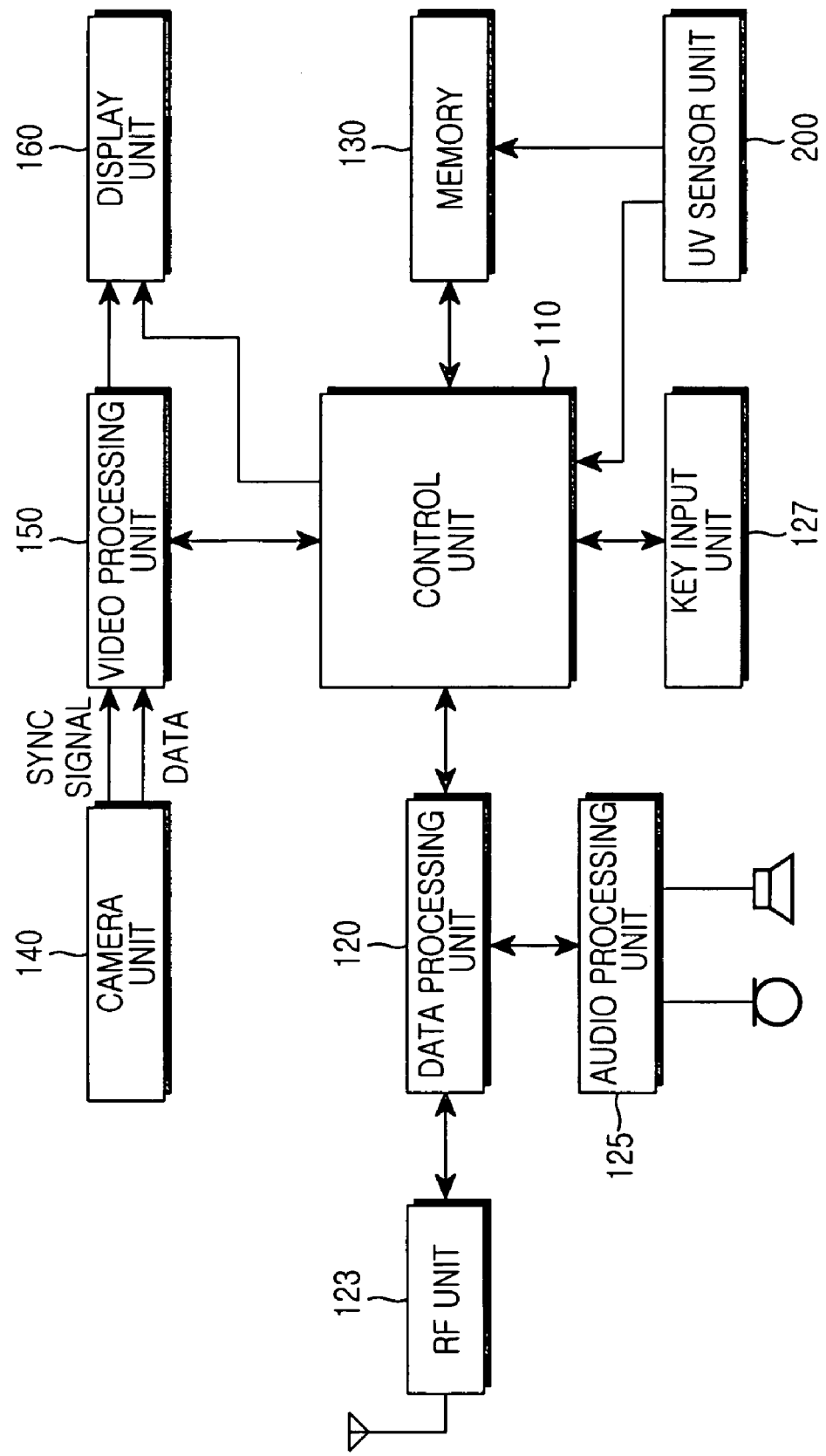
FIG. 2 is a block diagram illustrating a mobile terminal according to an embodiment of the present invention.

FIG. 2 is a block diagram illustrating a mobile terminal having a camera according to an embodiment of the present invention.

Referring to FIG. 2, a radio frequency (RF) unit 123 performs a wireless communication function. The RF unit 123 includes an RF transmitter (not shown) for up-converting and amplifying the frequency of a transmitted signal, and an RF receiver (not shown) for noiseless-amplifying and down-converting the frequency of the received signal.

A data processing unit 120 includes a transmitter (not shown) for encoding and modulating the transmitted signal, and a receiver (not shown) for demodulating and decoding the received signal. That is, the data processing unit 120 may be provided with a modem and a codec. The codec is provided with a data codec for processing packet data and an audio codec for processing an audio signal such as a sound signal. The audio processing unit 125 serves to reproduce the audio signal output from the audio codec of the data processing unit 120 or to transmit the audio signal produced from a microphone to the audio codec of the data processing unit 120. In an embodiment of the present invention, the audio processing unit 125 may output a UV alarm sound or warning sound through a speaker.

A memory 130 may includes a program memory and a data memory. In an embodiment, the program memory may store control programs for providing diverse information and service functions according to the UV index. Also, the data memory serves to temporarily store data produced during the execution of the programs. In an embodiment, the memory 130 stores avatars and alarm sounds for informing a user of the UV index at preset times, and stores avatars and audible warnings for informing a user of the high-risk UV index. In an embodiment, the memory 130 stores UV information output through a UV sensor unit 200.

A control unit 110 controls the whole operation of the mobile terminal. The control unit 110 may include the data processing unit 120. In an embodiment, the control unit 110 operates to inform a user of the corresponding UV index by avatars or alarm sounds at preset times. Also, the control unit 110 operates to warn users a high-risk UV index by avatars, provide alarm sounds or warning messages when the high-risk UV index is detected. Also, the control unit 110 operates to display the weekly, monthly and yearly UV index.

A camera unit, i.e., camera module, 140 includes a camera sensor for photographing video data and converting the photographed optical signal into an electrical signal, and a signal processing unit for converting an analog video signal photographed through the camera sensor into digital data. It is assumed that the camera sensor is a charge coupled device (CCD) sensor, and the signal processing unit is implemented by a Digital Signal Processor (DSP). Also, the camera sensor and the signal processing may be implemented as an integrated form or as separate units.

A video processing unit 150 produces video data for displaying the video signal output from the camera unit 140. The video processing unit 150 processes the video signal output from the camera unit 140 in the unit of a frame, and output frame video data to match the characteristic and size of a display unit 160. Also, the video processing unit 150 is provided with a video codec, and serves to compress the frame video data being displayed on the display unit 160 using a predetermined method or to restore the compressed frame data to the original frame video data. Here, the video codec may be a Joint Photographic Experts Group (JPEG) codec, an Movie Experts Group 4 (MPEG4) coded, a wavelet codec, and the like. It is assumed that the video processing unit 150 is provided with an On Screen Display (OSD) function, and the video processing unit 150 can output OSD display data in accordance with a displayed picture size under the control of the control unit 110.

The display unit 160 displays the video signal output from the video processing unit 150 and user data output from the control unit 110. The display unit 160 may be implemented by an LCD, and in this case, the display unit 160 may include an LCD controller, a memory for storing the video data, and an LCD display device. If implementing the LCD as a touch screen type, the display unit 160 may also operate as an input unit. A key input unit 127 is provided with keys for inputting numerals and text information and various kinds of function keys. In an embodiment, the display unit 160 can display avatars and accumulated UV indexes.

A UV sensor unit 200 includes a UV sensor for detecting the amount and the intensity of the UV rays and outputting a current signal in proportion to the detected UV intensity, and stores the UV information output through the UV sensor in the memory 130.

The operation of the mobile terminal will now be explained with reference to FIG. 2.

For an originating mode, if the user performs a dialing operation through the key input unit 127 and then sets the originating mode, the control unit 110 detects this, processes the dialed information received through the data processing unit 120, and then converts the dialed information into an RF signal through the RF unit 123 and outputs the RF signal. Thereafter, if the called subscriber generates a response signal, the control unit detects this through the RF unit 123 and the data processing unit 120. Then, the user can perform the communication function through a voice-communication path established by the audio processing unit 125. Also, for a destination mode, the control unit 110 detects the destination mode through the data processing unit 120, and generates a ring signal through the audio processing unit 125. Then, if the user responds to this, the control unit 110 detects this, and performs the communication function through the voice-communication path formed by the audio processing unit 125. In an embodiment, although an exemplary audio communication is described for the originating and destination modes, the invention can also be practiced using packet data and video data. Also, for a standby mode or a text communication, the control unit 110 displays the text data processed through the data processing unit 120 on the display unit 160.

Figure 3:
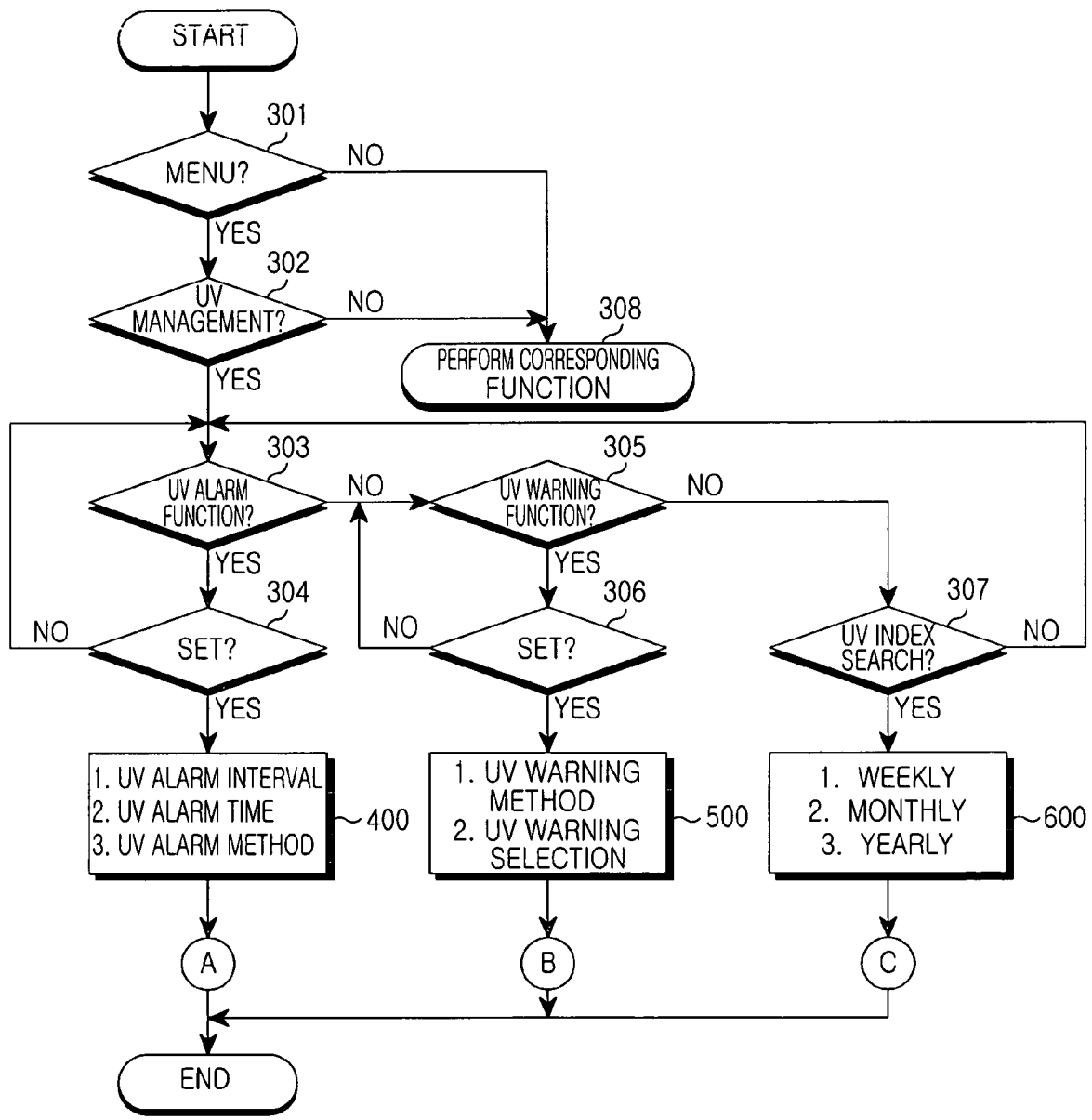
FIG. 3 is a flow chart illustrating a service implementing method according to a UV index in a mobile terminal according to an embodiment of the present invention.
Figure 4:
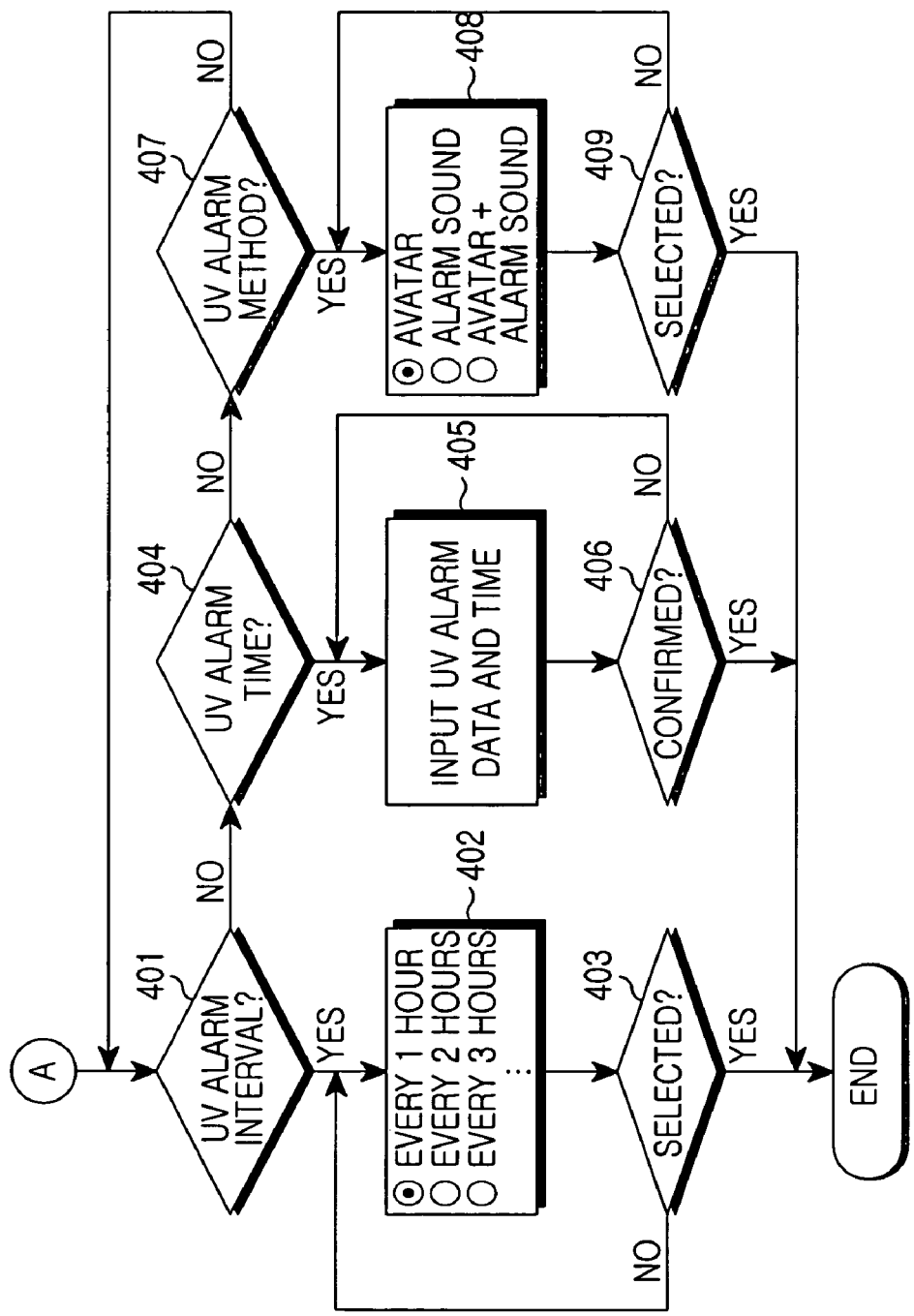
FIG. 4 is a flow chart illustrating a method of setting a UV alarm function shown in FIG. 3.
Figure 5:
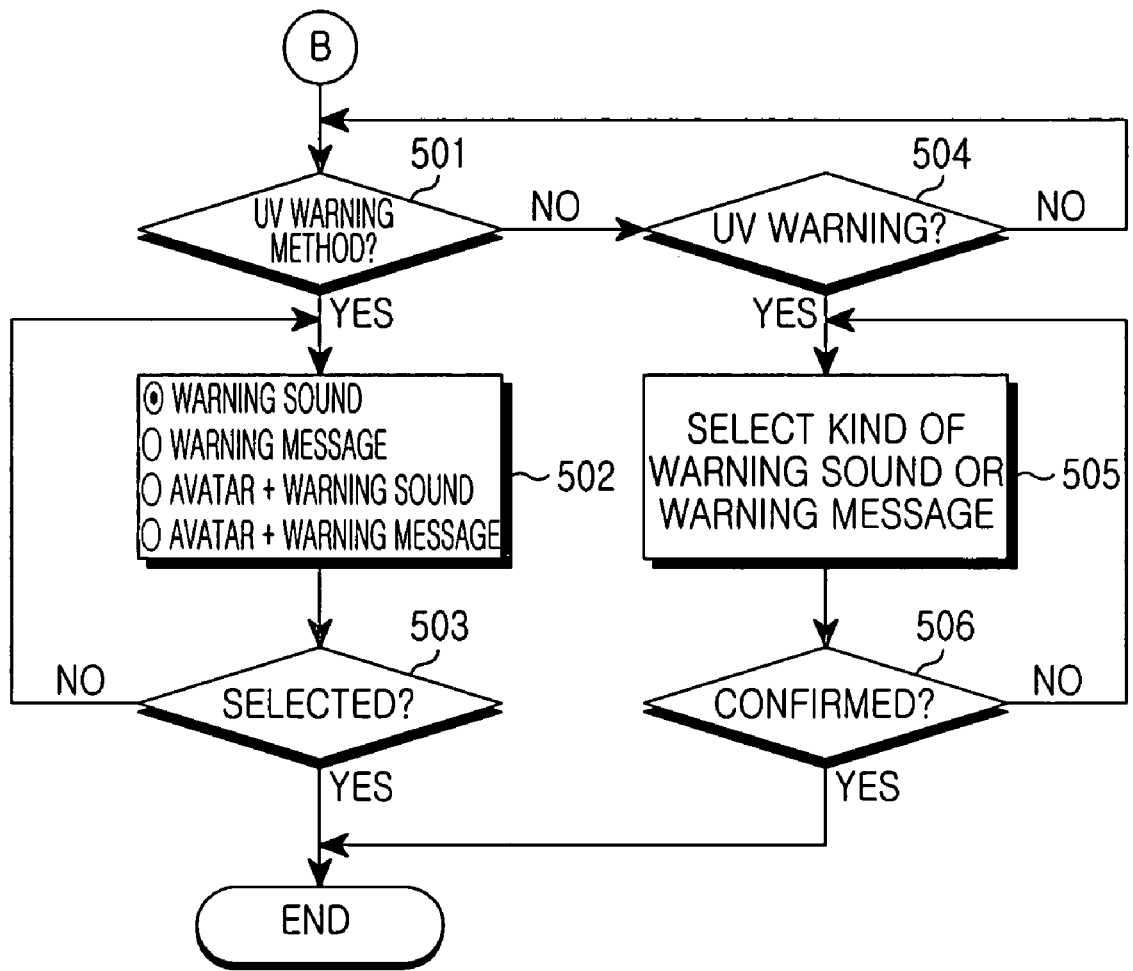
FIG. 5 is a flow chart illustrating a method of setting a UV warming function shown in FIG. 3.
Figure 6:
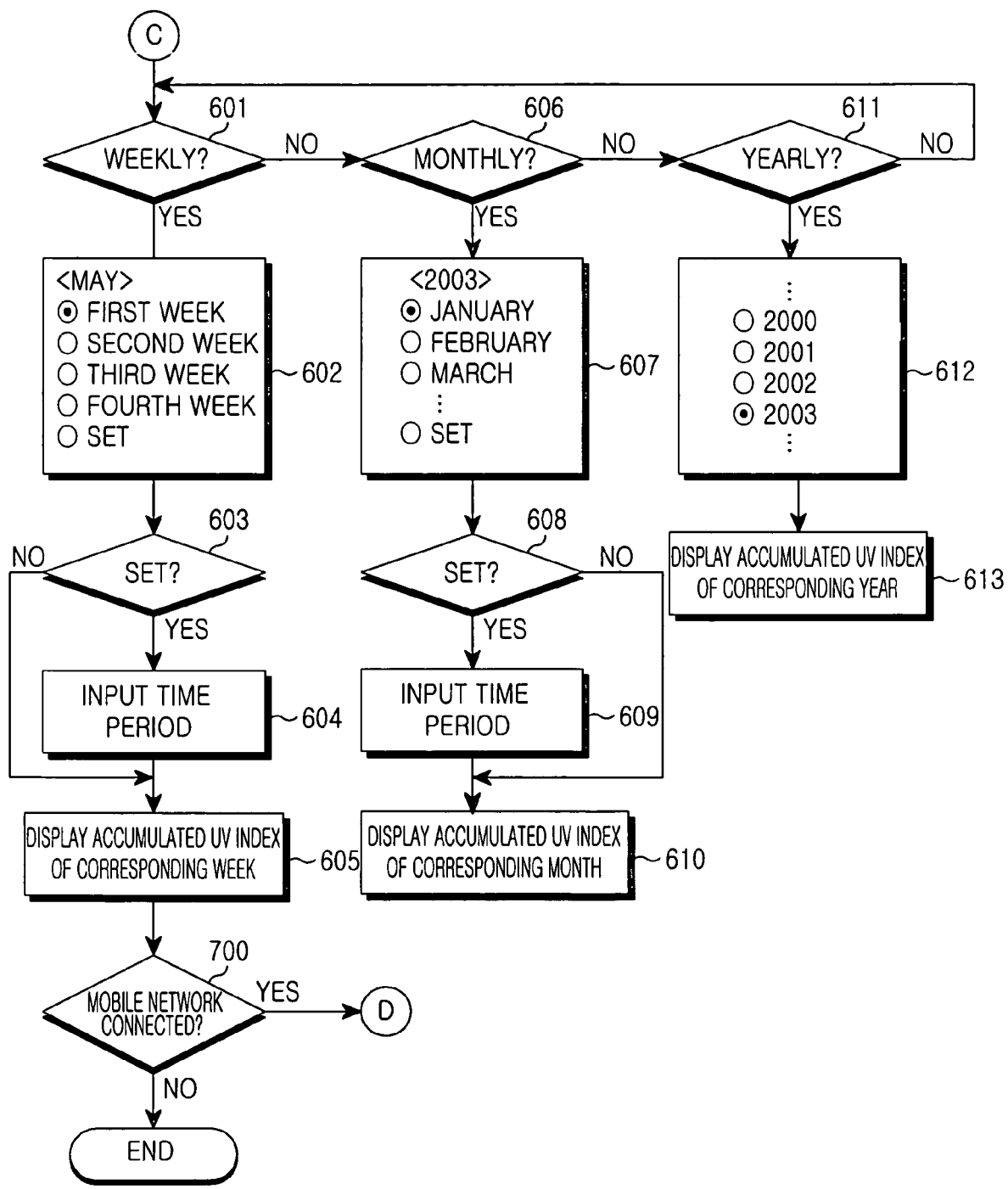
FIG. 6 is a flow chart illustrating a method of setting a UV search function shown in FIG. 3.
Figure 7:
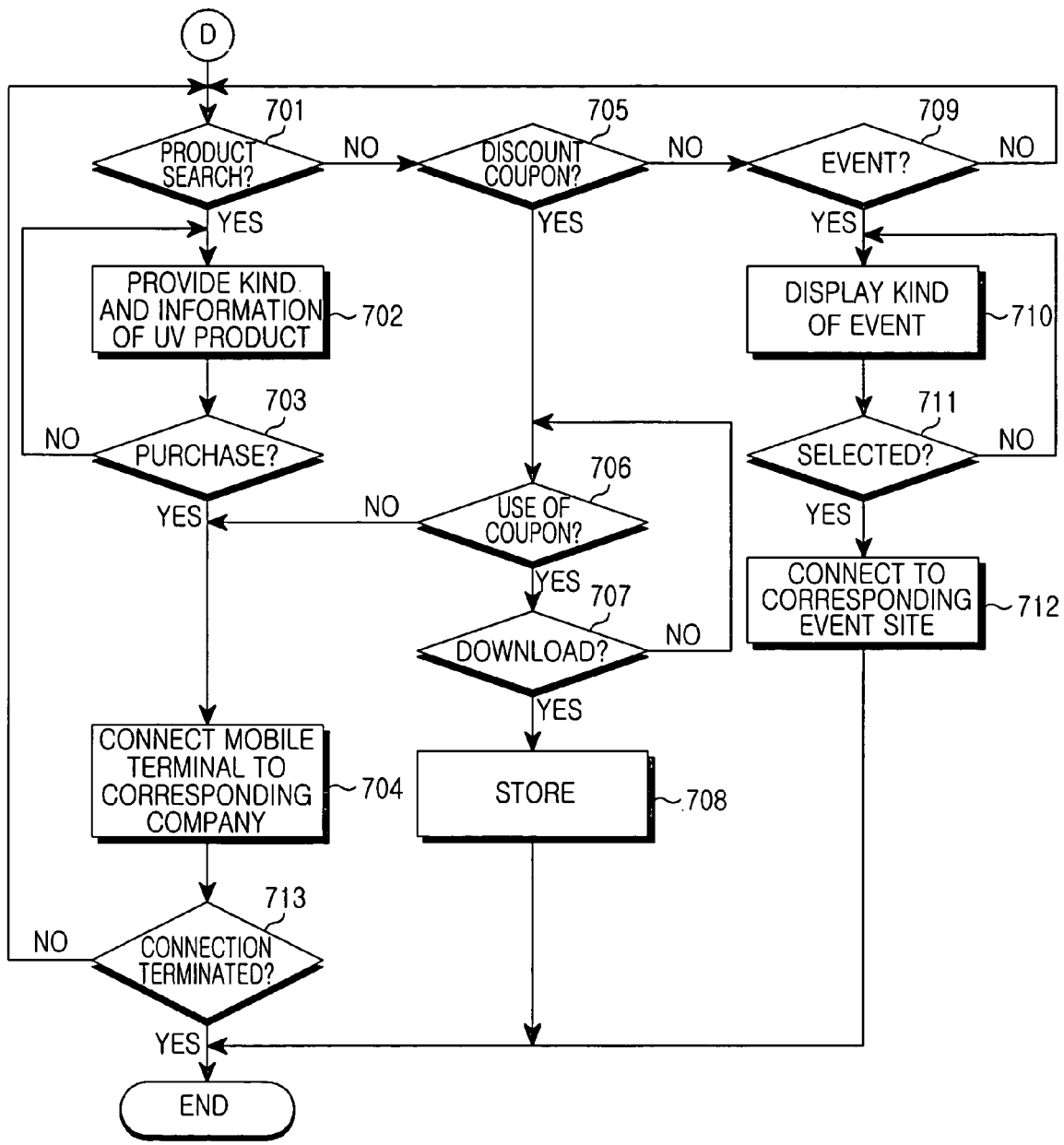
FIG. 7 is a flow chart illustrating a process of connecting to a mobile network in a mobile terminal according to an embodiment of the present invention.

FIG. 3 is a flow chart illustrating a service implementing method based on a UV index in a mobile terminal according to an embodiment of the present invention. FIG. 4 is a flow chart illustrating a method of setting a UV alarm function shown in FIG. 3, FIG. 5 is a flow chart illustrating a method of setting a UV warming function shown in FIG. 3, and FIG. 6 is a flow chart illustrating a method of setting a UV search function shown in FIG. 3. FIG. 7 is a flow chart illustrating a process of connecting to a mobile network in a mobile terminal according to an embodiment of the present invention.

Referring to FIG. 3, if the user of the mobile terminal presses a menu key of the key input unit 127, the control unit 110 detects this, and controls the display unit 160 to display a menu at step 301. If the user selects a UV management through the key input unit 127 in which the menu is displayed, the control unit 110 detects this at step 302, and control the display unit 160 to display the types of UV management. If the user does not display a menu or selects a UV management option, the method proceeds to step 308 where a corresponding function is performed.

If the user selects a UV alarm function in which the types of UV management are displayed, the control unit 110 detects this at step 303, and changes the present mode to a UV alarm function mode. If the user selects an alarm function mode, the control unit 110 detects this at step 304, and controls the display unit 160 to display the types of UV alarm functions at step 400 such as a UV alarm interval, a UV alarm time, and a UV alarm method.

Referring to FIG. 4, if the user selects a UV alarm interval in which the types of alarm functions are displayed, the control unit 11 detects this at step 401, and operates to display the types of alarm intervals at step 402. Here, the UV alarm intervals refer to time intervals at which the UV index is disclosed. If the user selects the UV alarm interval at step 402, the control unit 110 detects this at step 403, and sets the selected time as the alarm interval. Also, if the user selects a UV alarm time in which the types of alarm functions are displayed, the control unit 110 detects this at step 404, and the user inputs a specified date and time when the user desires to know the UV index at step 405. If the input is completed, the control unit 110 detects this at step 406, and sets the specified date and time as the alarm time input.

If the user selects a UV alarm method in which the types of alarm functions are displayed, the control unit 110 detects this at step 407, and controls the display unit 106 to display the types of alarm methods at step 408. Here, UV alarm methods refer to methods for informing a user of the UV index at the UV alarm interval or at the preset alarm time. If the user selects 'avatar' at step 408, the control unit 110 detects this at step 409, and operates to display the corresponding UV index and the corresponding avatar at the preset time. Also, if the user selects 'alarm sound' at step 408, the control unit 110 detects this at step 409, and generates the corresponding UV index and the corresponding alarm sound at the preset time. Also, if the user selects 'avatar+alarm sound' at step 408, the control unit 110 detects this at step 409, and operates to display and output the corresponding UV index, the corresponding avatar and the alarm sound at the preset time. Avatars can be downloaded through the Internet, and diverse avatars may be set according to the UV index through avatar decoration.

Meanwhile, if the user selects a UV warning function in a state in which the types of UV managements are displayed, the control unit 110 detects this at step 305, and changes the present mode to a UV warning function mode. If the user selects a warning function mode, the control unit 110 detects this at step 306, and controls the display unit 160 to display the types of UV warning functions at step 500.

Referring to FIG. 5, if the user selects a UV warning method in a state in which the types of UV warning functions are displayed, the control unit 110 detects this at step 501, and controls the display unit 106 to display the types of warning methods at step 502. Here, the UV warning methods refer to methods for informing a user of the UV index when the UV index indicates high-risk conditions. If the user selects 'warning sound' at step 502, the control unit 110 detects this at step 503, and if the high-risk UV index is detected, the control unit informs the user that the present UV index is a high-risk UV index by generating the set warning sound. Also, if the user selects 'warning message' at step 502, the control unit 110 detects this at step 503, and if the high-risk UV index is detected, the control unit informs the user that the present UV index is a high-risk UV index through the set warning message.

The warning sound and the warning message may simultaneously be generated, and in this case, the information about the present UV index may be displayed on the display unit 160. Also, if the user selects 'avatar+warning sound' at step 502, the control unit detects this at step 503, and if a high-risk UV index is detected, the control unit informs the user that the present UV index is a high-risk UV index by displaying the set avatar on the display unit 160 as well as by generating the set warning sound. Also, if the user selects 'avatar+warning message' at step 502, the control unit 110 detects this at step 503, and if a high-risk UV index is detected, the control unit informs the user that the present UV index is a high-risk UV index by displaying both the set warning message and the avatar on the display unit 160. In this case, the warning sound and the warning message can simultaneously be generated, and the information about the present UV index can be displayed on the display unit 160. Avatars can be downloaded through the Internet, and diverse avatars for informing a user of the high-risk UV index may be set through avatar decoration.

If the user selects a UV warning in which the types of UV warnings are displayed, the control unit 110 detects this at step 504, and performs step 505 for displaying the types of UV warnings. At step 505, the user may selectively set or input the warning sound or the warning message. If the warning sound or the warning message is selected at step 505, the control unit 110 sets the warning sound or the warning message selected at step 506 as the warning sound or the warning message to be generated when a high-risk UV index is detected.

Meanwhile, if the user selects a UV search function in which the types of UV managements are displayed, the control unit 110 detects this at step 307, and performs step 600 for displaying the types of the UV index search functions through the display unit 160.

Referring to FIG. 6, if the user selects a weekly UV index in which the types of UV index search functions are displayed, the control unit 110 detects this at step 601, and operates to display the types of weeks of the corresponding month through the display unit 160 at step 602. In this case, the corresponding month may be input through direction keys of the key input unit 127. If the user selects the corresponding week at step 602, the control unit 110 detects this at step 603, and displays the UV index corresponding to the selected week at step 605. If the user desires an input of a specified period, he/she directly inputs the corresponding period at step 604, and thus the control unit 110 displays the UV index corresponding to the input period through the display unit 160 at step 605.

Also, if the user selects a monthly UV index in a state in which the types of UV index search functions are displayed, the control unit 110 detects this at step 606, and operates to display the types of months of the corresponding year through the display unit 160 at step 607. In this case, the corresponding year may be input through direction keys of the key input unit 127. If the user selects the corresponding month at step 607, the control unit 110 detects this at step 608, and displays the UV index corresponding to the selected month at step 610. If the user desires an input of a specified period at step 607, they directly input the corresponding period at step 609, and thus the control unit 110 displays the UV index corresponding to the input period through the display unit 160 at step 610.

Also, if the user selects a yearly UV index in which the types of UV index search functions are displayed, the control unit 110 detects this at step 611, and operates to display the types of years through the display unit 160 at step 612. If the user selects the corresponding year at step 612, the control unit 110 detects this, and displays the UV index corresponding to the selected year at step 613. In this case, if the user desires an input of a specified period, they may directly input the corresponding period, and thus the control unit 110 displays the UV index corresponding to the input period through the display unit 160.

Meanwhile, if the user attempts a connection to a mobile network at step 605, 610 or 613, the control unit 110 detects this at step 700, and thus the mobile terminal is connected to the information related to the UV index.

Referring to FIG. 7, if the user selects a search for product information among the information related to the UV index in which the mobile terminal connects to the mobile network, the control unit 110 detects this at step 701, and performs step 702 for providing the types and information of the products that match the present UV index through the display unit 160. In this case, the products refer to UV-protective sunscreens, sunglasses, and the like, that match the present UV index. If a user selects a purchase of the product provided at step 702, the control unit 110 detects this at step 703, and connects the user to a company related to the product at step 704.

Also, if the user selects a discount coupon among the information related to the UV index in which the mobile terminal connects to the mobile network, the control unit 110 detects this at step 705, and displays the discount coupons of the products related to the UV index on the display unit 160. If the user selects the use of the discount coupon in which the discount coupons are provided, the control unit 110 detects this at step 706, and performs step 704 for connecting the user to a corresponding company that allows the user to use the discount coupon. If the user selects a download in which the discount coupon is provided, the control unit 110 detects this at step 707, and performs step 708 for storing the discount coupon in the memory 130.

Also, if the user selects an event among the information related to the UV index in which the mobile terminal connects to the mobile network, the control unit 110 detects this at step 709, and performs step 710 for displaying types of events related to the UV index on the display unit 160. If the user selects an event at step 710 for displaying the types of events related to the UV index, the control unit 110 detects this at step 711, and performs step 712 for connecting the user to a site corresponding to the selected event. If the connection to the mobile network is terminated, the control unit 110 detects this at step 713, and changes the present mode of the mobile terminal to a call standby mode. In an embodiment of the present invention, although the products, discount coupons and events related to the UV index are explained as an example of the information services related to the UV index, the present invention is not limited thereto, but it can provide diverse information services related to the UV index.

Figure 8:
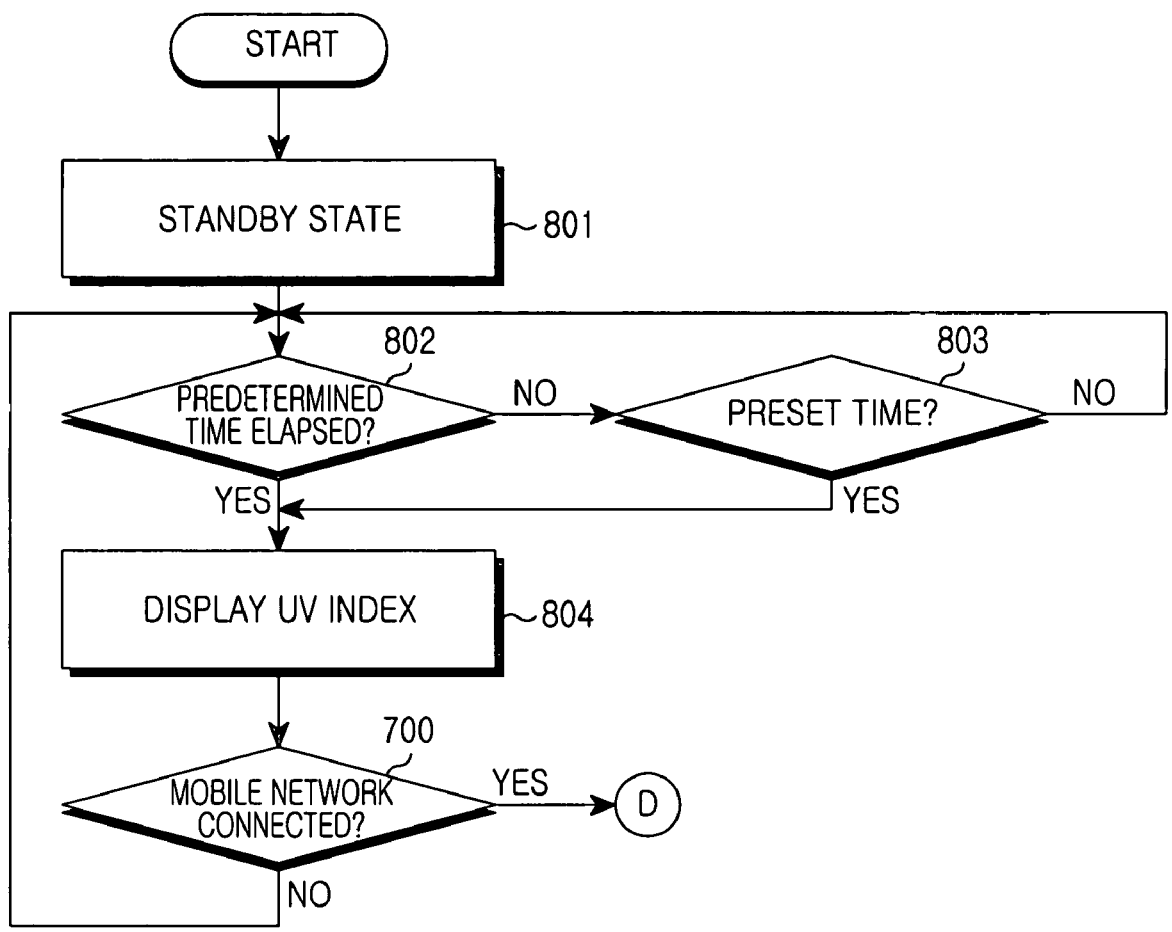
FIG. 8 is a flow chart illustrating a method of displaying a UV index according to a UV alarm time in a mobile terminal according to an embodiment of the present invention.

FIG. 8 is a flow chart illustrating a method of displaying a UV index according to a UV alarm time in a mobile terminal according to an embodiment of the present invention. This method according to an embodiment of the present invention will be explained in detail with reference to FIGS. 2, 4, 7 and 8.

Referring to FIG. 8, in a call standby state at step 801, the control unit 110 determines a UV index alarm time set by the user. In this case, if the user sets 'UV alarm interval' at step 401 as illustrated in FIG. 4, the control unit 110 detects this at step 802, and checks the set alarm interval. If the user sets 'UV alarm time', the control unit 110 detects this at step 803, and checks whether the preset time elapses. If the preset alarm interval or the specified time elapses, the control unit 110 displays the present UV index stored in the memory 130 on the display unit 160 at step 804. The UV index is displayed on the display unit 160 by 'UV alarm method' set by the user at step 407 as illustrated in FIG. 4. If 'UV alarm method' is set to 'avatar+alarm sound', the alarm sound is output through the speaker, and the UV index according to the preset time is displayed on the display unit 160 along with the avatar. At this time, the information related to the UV index may be displayed on the display unit 160. If the user attempts to connect the mobile terminal to the mobile network connection in which the UV index is displayed at step 804, the control unit 110 detects this at step 700, and connects the mobile terminal to the information related to the UV index as shown in FIG. 7.

Figure 9:
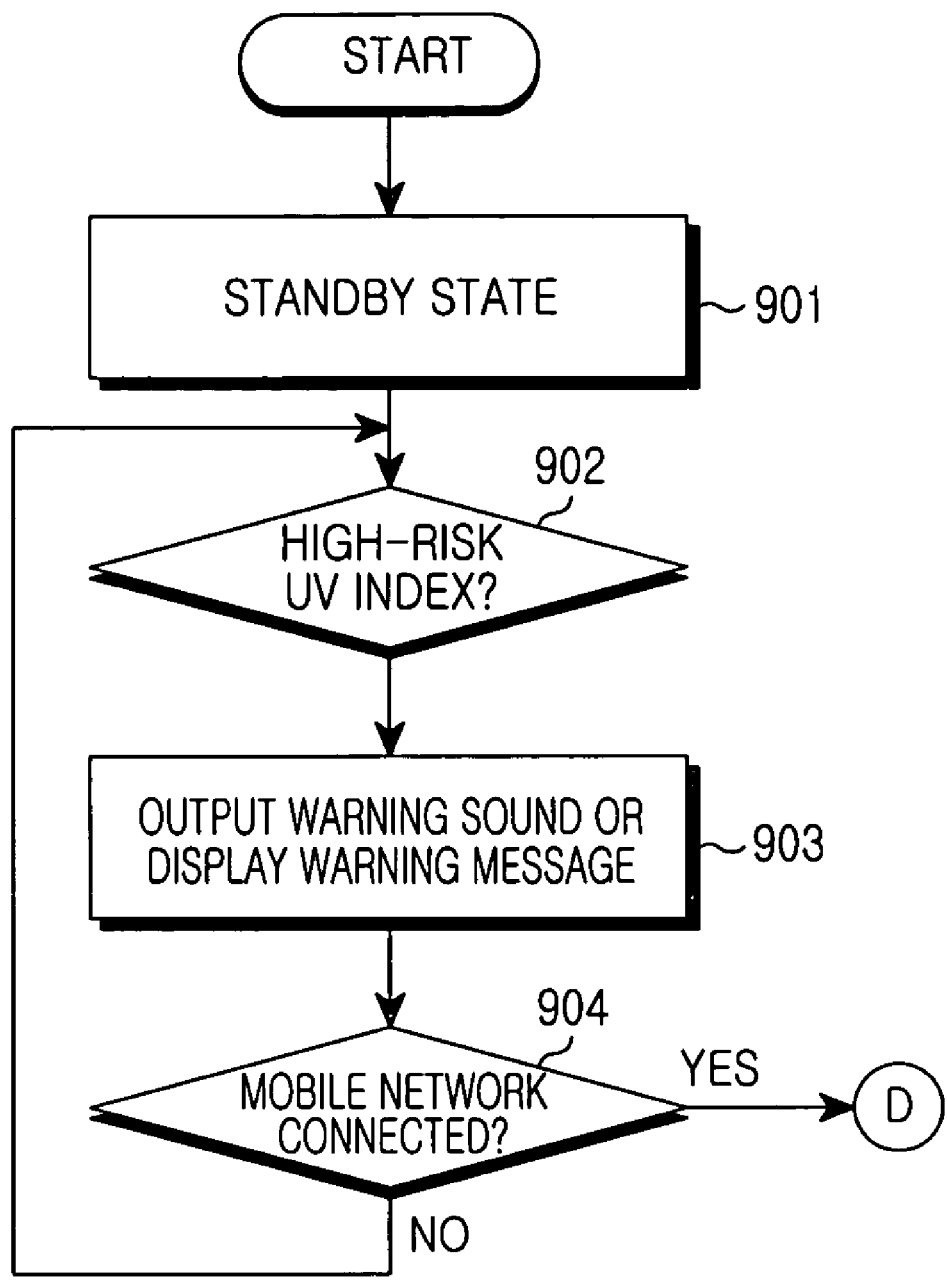
FIG. 9 is a flow chart illustrating a method of displaying a high-risk UV index according to a UV warning in a mobile terminal according to an embodiment of the present invention.

FIG. 9 is a flow chart illustrating a method of displaying a high-risk UV index according to a UV warning in a mobile terminal according to an embodiment of the present invention. This method according to the embodiment of the present invention will be explained in detail with reference to FIGS. 2, 5, 7 and 9.

Referring to FIG. 9, in a call standby state at step 901, the control unit 110 determines whether the present UV index is a high-risk UV index. Generally, the UV index is may be classified into indexes of very low (0 to 2.9), low (3 to 4.9), moderate (5 to 6.9), high (7 to 8.9), and very high (over 9), and the risky UV index can be set by the user. If the high-risk UV index is set to '9', the control unit 110 detects this at step 902, and performs step 904 for informing a user that the present UV index is a high-risk UV index. At step 904, the high-risk UV index is disclosed to the user according to the 'UV warning method' of FIG. 5 or the set 'UV warning'. If the 'avatar+ warning sound' is set, the set warning sound is output through the speaker, and the avatar for informing a user of the set high-risk UV index is displayed on the display unit 160. At this time, the warning message or the information related to the UV index may be displayed on the display unit 160. If the user attempts the mobile network connection in the state that the high-risk UV index is displayed at step 903, the control unit 110 detects this at step 700, and connects the mobile terminal to the information related to the UV index as shown in FIG. 7.

As described above, the present invention has the advantages that it can provide diverse information and services according to the UV index detected by a mobile terminal having an ultraviolet sensor mounted thereon, and thus it can provide convenience in use and prevent overexposure to the UV rays.

While the invention has been shown and described with reference to certain embodiments thereof, it will be understood by those skilled in the art that various changes in form and details may be made therein without departing from the spirit and scope of the invention as defined by the appended claims.

What is claimed is:

1. A service implementing method according to an ultraviolet index in a mobile terminal, comprising the steps of:
    setting an alarm time and an alarm method for informing a user of the ultraviolet index in a ultraviolet management mode;
    informing the user of the detected ultraviolet index according to the set alarm method upon receipt of the set alarm time; and
    providing information to the mobile terminal according to the displayed ultraviolet index when the mobile terminal connects to a mobile network in a state in which the detected ultraviolet index is displayed.

2. The method as claimed in claim 1, wherein the step for setting the alarm time and the alarm method comprises:
    switching to an ultraviolet alarm function mode when an alarm function is selected in the ultraviolet management mode;
    setting a predetermined time interval for informing the user of the ultraviolet index when an alarm interval is selected in the ultraviolet alarm function mode;
    setting a specified time for informing the user of the ultraviolet index when the alarm time is selected in the ultraviolet alarm function mode; and
    setting one of a character and alarm sound for informing the user of the ultraviolet index according to the preset time when the alarm method is selected in the ultraviolet alarm function mode.

3. The method as claimed in claim 2, wherein the character and the alarm sound are set together in the alarm method, and the character and the alarm sound are differently set according to the ultraviolet index.

4. The method as claimed in claim 1, wherein when the mobile terminal connects to the mobile network, information is provided on products, discount coupons and events according to the ultraviolet index.

5. The method as claimed in claim 1, further comprising the steps of:
    displaying types and information of the products when information on products according to the ultraviolet index is selected, in which the mobile terminal connects to the mobile network; and
    connecting the mobile terminal to a company corresponding to the products when a product purchase is selected.

6. The method as claimed in claim 1, further comprising the steps of:
    displaying types and information of the discount coupons when information on the discount coupons according to the ultraviolet index is selected, in which the mobile terminal connects to the mobile network; and
    connecting the mobile terminal to a company corresponding to the discount coupons when use of the discount coupons is selected.

7. The method as claimed in claim 1, further comprising the steps of:
    displaying types and information of the events when information on the events according to the ultraviolet index is selected, in which the mobile terminal connects to the mobile network; and
    connecting the mobile terminal to the selected event site when the events are selected.

8. A service implementing method according to an ultraviolet index in a mobile terminal, comprising the steps of:
    setting a warning method and a warning type for informing the user of a high-risk ultraviolet index in the ultraviolet management mode;
    giving a risk warning according to the set warning method when a high-risk ultraviolet index is found; and
    providing information to the mobile terminal according to the displayed ultraviolet index when the mobile terminal connects to a mobile network in a state in which the founded ultraviolet index is displayed.

9. The method as claimed in claim 8, wherein the step for setting the warning method and the warning type:
    switching to an ultraviolet warning function mode for informing the user of the high-risk ultraviolet index when an ultraviolet warning is selected in the ultraviolet management mode;
    setting at least one of a character, a warning sound and a warning message for informing the user of the high-risk ultraviolet index when an ultraviolet warning method is selected in the ultraviolet warning function mode; and
    setting the type of character, warning sound or warning message according to the set warning method when the ultraviolet warning is selected in the ultraviolet warning function mode.

10. The method as claimed in claim 8, wherein when the mobile terminal connects to the mobile network, and information is provided on products, discount coupons and events according to the ultraviolet index.

11. The method as claimed in claim 8, further comprising the steps of:
- displaying types and information of the products when information on products according to the ultraviolet index is selected, in which the mobile terminal connects to the mobile network; and
- connecting the mobile terminal to a company corresponding to the products when a product purchase is selected.

12. The method as claimed in claim 8, further comprising the steps of:
- displaying types and information of the discount coupons when information on the discount coupons according to the ultraviolet index is selected, in which the mobile terminal connects to the mobile network; and
- connecting the mobile terminal to a company corresponding to the discount coupons when use of the discount coupons is selected.

13. The method as claimed in claim 8, further comprising the steps of:
- displaying types and information of the events when information on the events according to the ultraviolet index is selected, in which the mobile terminal connects to the mobile network; and
- connecting the mobile terminal to the selected event site when the events are selected.

14. The method as claimed in claim 8, further comprising the steps of:
- displaying an accumulated ultraviolet index according to a corresponding time period when a function of searching for the ultraviolet index is selected in an ultraviolet index management mode.

15. The method as claimed in claim 14, wherein the accumulated ultraviolet index is displayed at at least one of weekly, monthly, yearly, and at specified intervals.

16. The method as claimed in claim 14, wherein when the mobile terminal connects to the mobile network, information is provided on products, discount coupons and events according to the ultraviolet index.

17. The method as claimed in claim 14, further comprising the steps of:
- displaying types and information of the products when information on products according to the ultraviolet index is selected, in which the mobile terminal connects to the mobile network; and
- connecting the mobile terminal to a company corresponding to the products when a product purchase is selected.

18. The method as claimed in claim 14, further comprising the steps of:
- displaying types and information of the discount coupons when information on the discount coupons according to the ultraviolet index is selected, in which the mobile terminal connects to the mobile network; and
- connecting the mobile terminal to a company corresponding to the discount coupons when use of the discount coupons is selected.

19. The method as claimed in claim 14, further comprising the steps of:
- displaying types and information of the events when information on the events according to the ultraviolet index is selected, in which the mobile terminal connects to the mobile network; and
- connecting the mobile terminal to the selected event site when the events are selected.

20. An apparatus for providing information and service based on an ultraviolet index in a mobile terminal, the apparatus comprising:
- an ultraviolet sensor adapted to detect ultraviolet index levels;
- an audio processing unit adapted to output an ultraviolet alarm upon receipt of a predetermined alarm time, and output a warning sound when a high-risk ultraviolet index is found;
- a memory adapted to store a control program for providing information and a service function according to the ultraviolet index, and store the ultraviolet information output through the ultraviolet sensor;
- a controller adapted to set an alarm time and an alarm method for informing a user of the ultraviolet index, and set a warning method and a warning type for informing the user of a high-risk ultraviolet index in the ultraviolet management mode;
- informing the user of the detected ultraviolet index according to the set alarm method upon receipt of set alarm time, and giving a risk warning according to the set warning method when a high-risk ultraviolet index is found; and
- providing information to the mobile terminal according to the displayed ultraviolet index when the mobile terminal connects to a mobile network in a state in which the detected ultraviolet index is displayed.

21. The apparatus as claimed in claim 20, wherein the controller is further adapted to display an accumulated ultraviolet index according to a corresponding time period when a function of searching for the ultraviolet index is selected in the ultraviolet index management mode, and to provide information according to the ultraviolet index when the mobile terminal connects to a mobile network in a state in which the ultraviolet index is displayed.

22. The apparatus as claimed in claim 20, wherein the controller is further adapted to set at least one of a character or an alarm sound or the character and alarm sound when the alarm method is set.

23. The apparatus as claimed in claim 20, wherein the controller is further adapted to switch to an ultraviolet alarm function mode, and set the alarm time and the alarm method for informing the user of the ultraviolet index when the ultraviolet alarm is selected in the ultraviolet management mode; and switch to an ultraviolet warning function mode for informing the user of the high-risk ultraviolet index, and set a warning method and a warning type for informing the user of the high-risk ultraviolet index when a ultraviolet warning is selected in the ultraviolet management mode.

24. The apparatus as claimed in claim 20, wherein the controller is further adapted to set at least one of a character, a warning sound and a warning message for informing the user of the high-risk ultraviolet index when the warning method is set; and set at least one of types of the character, warning sound or warning message according to the set warning method when the warning type is set.

25. The apparatus as claimed in claim 20, wherein the controller is further adapted to set at least one of the warning sound or the warning message, or the character and the warning sound, or the character and the warning message when the warning method is set.

* * * * *